(12) United States Patent
Gilliam

(10) Patent No.: US 8,668,207 B1
(45) Date of Patent: Mar. 11, 2014

(54) PRODUCT PROMOTION STORAGE RACK AND CADDY SYSTEM

(71) Applicant: James R. Gilliam, Clearwater, FL (US)

(72) Inventor: James R. Gilliam, Clearwater, FL (US)

( * ) Notice: Subject to any disclaimer, the term of this patent is extended or adjusted under 35 U.S.C. 154(b) by 0 days.

(21) Appl. No.: 13/897,417

(22) Filed: May 19, 2013

(51) Int. Cl.
*B62D 39/00* (2006.01)

(52) U.S. Cl.
USPC ............................. 280/33.992; 280/769

(58) Field of Classification Search
USPC .................................. 280/769; 248/99, 303
See application file for complete search history.

(56) References Cited

U.S. PATENT DOCUMENTS

| | | | | |
|---|---|---|---|---|
| 5,826,359 | A * | 10/1998 | Thalenfeld et al. | 40/642.01 |
| 8,191,845 | B1 * | 6/2012 | Yu | 248/304 |
| 2004/0232288 | A1 * | 11/2004 | Kung | 248/99 |

* cited by examiner

*Primary Examiner* — John Walters
*Assistant Examiner* — James Triggs

(57) ABSTRACT

A product promotion storage rack is formed of a base plate having a front surface and a rear surface. The base plate has upper and lower edges. The base plate has parallel left and right edges. A plurality of laterally spaced long fingers extend forwardly from the front surface. Each long finger has a horizontal first short leg and an upwardly extending vertical first long leg. A plurality of laterally spaced inverted short fingers extend rearwardly from the rear surface. Each short finger has a horizontal second short leg and a downwardly extending vertical second long leg.

1 Claim, 2 Drawing Sheets

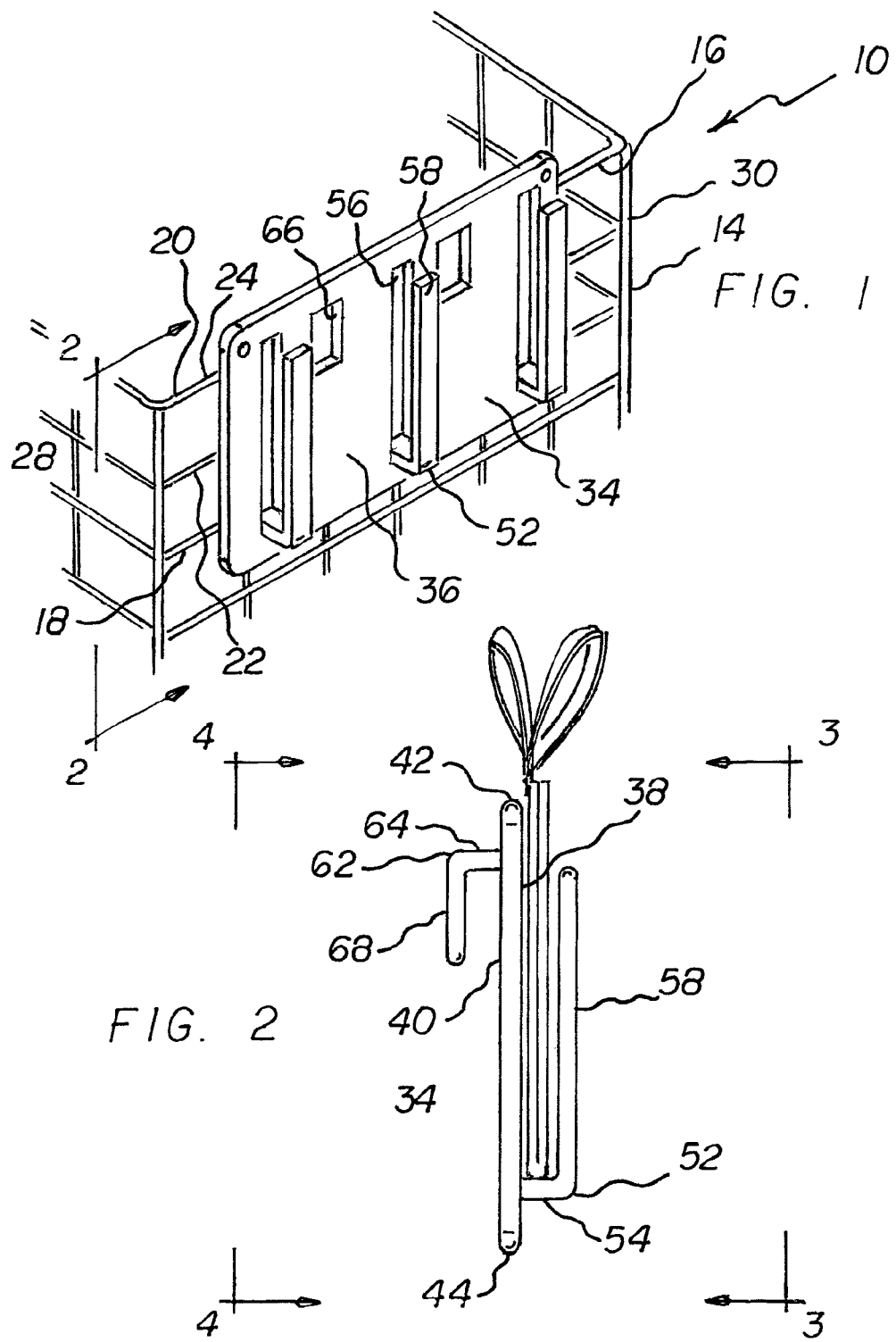

PRODUCT PROMOTION STORAGE RACK AND CADDY SYSTEM

BACKGROUND OF THE INVENTION

1. Field of the Invention

The present invention relates to a product promotion storage rack and caddy system removably positionable on a shopping cart and more particularly pertains to removably receiving re-usable shopping bags, the removable positioning and the removable receiving being done in a safe, convenient and economical manner.

2. Description of the Prior Art

The use of product storage racks and caddy systems of known designs and configurations is known in the prior art. More specifically, product storage racks and caddy systems of known designs and configurations previously devised and utilized for the purpose of product promotion and removably receiving re-usable shopping bags on a shopping cart and are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a product promotion storage rack and caddy system that is removably positionable on a shopping cart and more particularly pertains to removably receiving re-usable shopping bags, the removable positioning and the removable receiving being done in a safe, convenient and economical manner.

In this respect, the product promotion storage rack and caddy system according to the present invention substantially departs from the conventional concepts and designs of the prior art, and in doing so provides an apparatus primarily developed for the purpose of being removably positionable on a shopping cart and more particularly pertains to removably receiving re-usable shopping bags, the removable positioning and the removable receiving being done in a safe, convenient and economical manner.

Therefore, it can be appreciated that there exists a continuing need for a new and improved product promotion storage rack and caddy system which can be removably positioned on a shopping cart and more particularly pertains to removably receiving re-usable shopping bags, the removable positioning and the removable receiving being done in a safe, convenient and economical manner. In this regard, the present invention substantially fulfills this need.

SUMMARY OF THE INVENTION

In view of the foregoing disadvantages inherent in the known types of product storage racks and caddy systems of known designs and configurations now present in the prior art, the present invention provides an improved product promotion storage rack and caddy system. As such, the general purpose of the present invention, which will be described subsequently in greater detail, is to provide a new and improved product promotion storage rack and caddy system and method which has all the advantages of the prior art and none of the disadvantages.

To attain this, the present invention essentially comprises product promotion storage rack formed of a base plate having a front surface and a rear surface. The base plate has upper and lower edges. The base plate has parallel left and right edges. A plurality of laterally spaced long fingers extend forwardly from the front surface. Each long finger has a horizontal first short leg and an upwardly extending vertical first long leg. A plurality of laterally spaced inverted short fingers extend rearwardly from the rear surface. Each short finger has a horizontal second short leg and a downwardly extending vertical second long leg.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved product promotion storage rack and caddy system which has all of the advantages of the prior art product storage racks and caddy systems of known designs and configurations and none of the disadvantages.

It is another object of the present invention to provide a new and improved product promotion storage rack and caddy system which may be easily and efficiently manufactured and marketed.

It is further object of the present invention to provide a new and improved product promotion storage rack and caddy system which is of durable and reliable constructions.

An even further object of the present invention is to provide a new and improved product promotion storage rack and caddy system which is susceptible of a low cost of manufacture with regard to both materials and labor, and which accordingly is then susceptible of low prices of sale to the consuming public, thereby making such product promotion storage rack and caddy system economically available to the buying public.

Lastly, it is an object of the present invention to provide a product promotion storage rack and caddy system removably positionable on a shopping cart and more particularly pertains to removably receiving re-usable shopping bags, the removable positioning and the removable receiving being done in a safe, convenient and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of a product promotion storage rack and caddy system constructed in accordance with the principles of the present invention.

FIG. 2 is a side elevational view of the system taken along line 2-2 of FIG. 1.

The same reference numerals refer to the same parts throughout the various Figures.

DESCRIPTION OF THE PREFERRED EMBODIMENT

Figure 3:
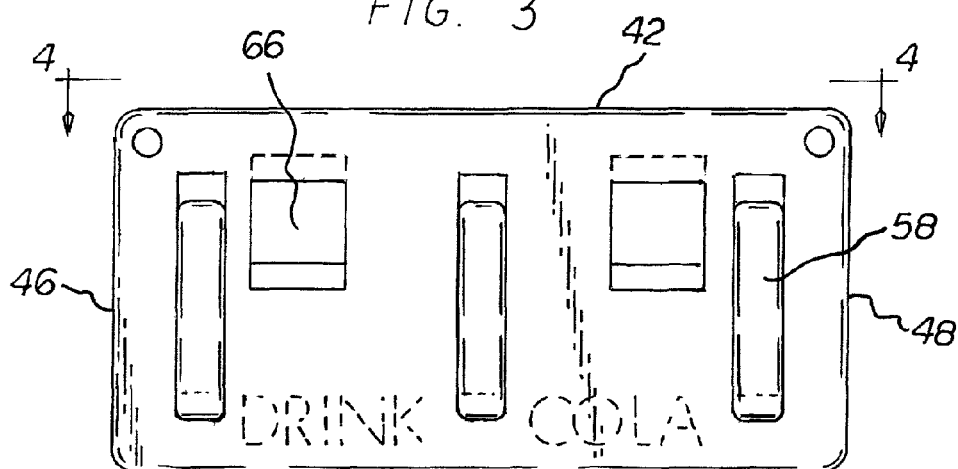
FIGS. 3 and 4 are front end rear elevational views of the system taken along lines 3-3 and 4-4 of FIG. 2.
Figure 4:
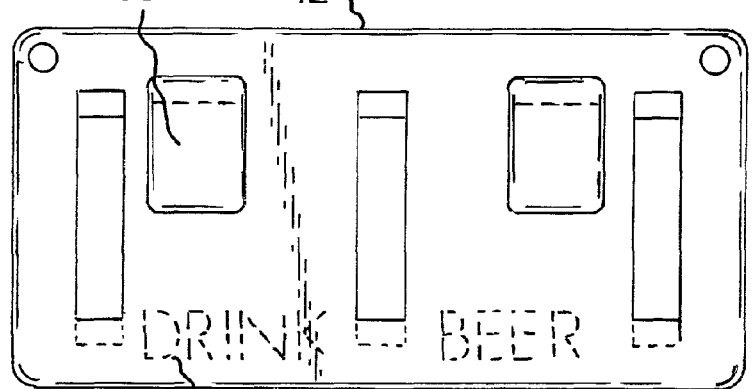
Figure 5:
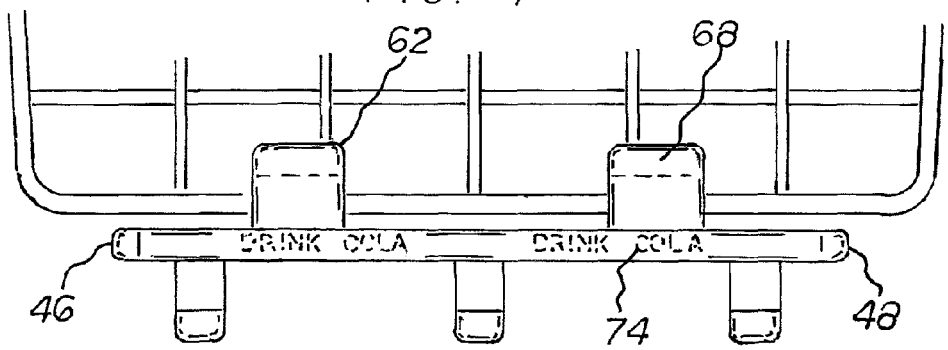
FIG. 5 is a plan view of the system taken along line 5-5 of FIG. 3.

With reference now to the drawings, and in particular to FIG. 1 thereof, the preferred embodiment of the new and improved product promotion storage rack and caddy system embodying the principles and concepts of the present invention and generally designated by the reference numeral 10 will be described.

The present invention, the product promotion storage rack and caddy system 10 is comprised of a plurality of components. Such components in their broadest context include a rack and a plurality of long and short fingers and a plurality of short fingers. Such components are individually configured and correlated with respect to each other so as to attain the desired objective.

A product promotion storage rack and caddy system 10 removably positionable on a shopping cart for removably receiving re-usable shopping bags, the removable positioning and the removable receiving being done in a safe, convenient and economical manner, the system comprising, in combination:

First provided is a shopping cart 14. The shopping cart is formed with a wire basket 16. The wire basket has a front face 18 with an interior face 20 and an exterior face 22. The front face has an upper end 24 and a parallel lower end separated by a basket height. The front face has a left end 28 and a parallel right end 30 separated by a basket width.

A rack 34 is next provided. The rack has a base plate 36 in a rectangular configuration having a front surface 38 and a rear surface 40 separated by a base plate thickness. The base plate has an upper edge 42 and a parallel lower edge 44 separated by a base plate height. The base plate has a left base plate edge 46 and a parallel right base plate edge 48 separated by a base plate width. The rack is generally flat for ease of storage and retrieval in a home or a vehicle. The base plate has three long slots 56 and two short slots 66.

Three laterally spaced long fingers 52 in an L-shaped configuration extend forwardly from the front surface of the base plate. Each long finger has a horizontal first short leg 54. Each long finger has an upwardly extending, vertical first long leg 58 forwardly of and parallel with the rectangular long slots. The long fingers are adapted to removably receive and support up to five re-usable shopping bags of the type having handles for easy transport.

Two laterally spaced inverted short fingers 62 in an inverted L-shaped configuration extend rearwardly from the front surface of the base plate. Each short finger has a horizontal second short leg 64. Each short finger has a downwardly extending, vertical second long leg 68 rearwardly of and parallel with the rectangular short slots. The short fingers are adapted to hook over the upper end of the front face of the shopping cart for the removable coupling of the base plate to the front face of the shopping cart.

The base plate including the long fingers and the short fingers are fabricated of a durable, long life, heavy duty polycarbonate.

Lastly, indicia 72, 74 is provided on the front surface of the base plate and on the upper edge of the base plate. The indicia is, preferably, the name of a consumer product.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A product promotion storage rack and caddy system (10) removably positionable on a shopping cart for removably receiving re-usable shopping bags, the removable positioning and the removable receiving being done in a safe, convenient and economical manner, the system comprising, in combination:

a shopping cart (14) formed with a wire basket (16), the wire basket having a front face (18) with an interior face (20) and an exterior face (22), the front face having an upper end (24) and a parallel lower end (26) separated by a basket height, the front face having an left end (28) and a parallel right end (30) separated by a basket width;

a rack (34) having a base plate (36) in a rectangular configuration having a front surface (38) and a rear surface (40) separated by a base plate thickness, the base plate having an upper edge (42) and a parallel lower edge (44) separated by a base plate height, the base plate having a left base plate edge (46) and a parallel right base plate edge (48) separated by a base plate width, the rack being generally flat for ease of storage and retrieval in a home and a vehicle, the base plate having three long slots (56) and two short slots (66);

three laterally spaced long fingers (52) in an L-shaped configuration extending forwardly from the front surface of the base plate, each long finger having a horizontal first short leg (54), each long finger having an upwardly extending, vertical first long leg (58) forwardly of and parallel with the long slots, the long fingers adapted to removably receive and support up to five re-usable shopping bags of the type having handles for easy transport;

two laterally spaced short fingers (62) in an inverted L-shaped configuration extending rearwardly from the front surface of the base plate, each short finger having a horizontal second short leg (64), each short finger having a downwardly extending, vertical second long leg (68) rearwardly of and parallel with the rectangular short slots, the short fingers adapted to hook over the upper end of the front face of the shopping cart for the removable coupling of the base plate to the front face of the shopping cart;

the base plate including the long fingers and the short fingers being fabricated of a durable, long life, heavy duty polycarbonate; and indicia (72) (74) on the front surface of the base plate and on the upper edge of the base plate, the indicia being the name of a consumer product.

\* \* \* \* \*